US007641211B2

(12) United States Patent
Ivanchenko

(10) Patent No.: US 7,641,211 B2

(45) Date of Patent: Jan. 5, 2010

(54) APPARATUS FOR TRANSPORTING AN INVALID

(75) Inventor: Volodymyr Ivanchenko, 3181-717 Bayview Avenue, Toronto, Ontario (CA) M2K 2Y2

(73) Assignee: Volodymyr Ivanchenko, Toronto (CA)

(*) Notice: Subject to any disclaimer, the term of this patent is extended or adjusted under 35 U.S.C. 154(b) by 96 days.

(21) Appl. No.: 11/907,734

(22) Filed: Oct. 17, 2007

(65) Prior Publication Data

US 2008/0100036 A1 May 1, 2008

(30) Foreign Application Priority Data

Oct. 31, 2006 (CA) .................................... 2566551

(51) Int. Cl.
*B62M 1/14* (2006.01)

(52) U.S. Cl. ................ 280/250.1; 280/233; 280/304.1; 280/647

(58) Field of Classification Search ................ 280/233, 280/211, 228, 250.1, 304.1, 657, 847, 224, 280/647; 297/DIG. 4, 90, 325; 5/618, 626, 5/86.1
See application file for complete search history.

(56) References Cited

U.S. PATENT DOCUMENTS

| | | | | | |
|---|---|---|---|---|---|
| 2,427,782 | A | * | 9/1947 | Hausman | 280/233 |
| 2,578,068 | A | * | 12/1951 | Johnson | 280/847 |
| 2,877,047 | A | | 3/1959 | Weil | |
| 2,877,048 | A | | 3/1959 | Weil | |
| 3,137,511 | A | | 6/1964 | Weil et al. | |
| 3,147,039 | A | * | 9/1964 | Smith et al. | 297/90 |
| 3,289,219 | A | * | 12/1966 | Ferneau et al. | 5/626 |
| 3,889,963 | A | | 6/1975 | Brattgard | |
| 4,105,242 | A | * | 8/1978 | Terbeek | 280/640 |
| 4,453,732 | A | | 6/1984 | Assanah et al. | |
| 4,717,169 | A | | 1/1988 | Shaffer | |
| 4,962,942 | A | | 10/1990 | Barnett | |
| 5,669,620 | A | * | 9/1997 | Robbins | 280/250.1 |
| 5,884,929 | A | * | 3/1999 | Kincaid | 280/304.1 |

(Continued)

FOREIGN PATENT DOCUMENTS

| | | |
|---|---|---|
| FR | 2399822 | 3/1979 |
| WO | WO 98/46184 | 10/1998 |

*Primary Examiner*—Hau V Phan
(74) *Attorney, Agent, or Firm*—Bereskin & Parr

(57) ABSTRACT

A transportation apparatus includes a backrest and leg support pivotably connected to a seat portion. The seat portion is slidably connected to first and second spaced apart slide rails. Each slide rail includes a plurality of telescoping members. At least one middle leg and at least one rear leg depends downwardly from the seat portion. At least one middle wheel is connected to the middle leg and at least one rear wheel is connected to the rear leg. The middle wheel and rear wheel define a middle and rear rotation axes, respectively. At least one front wheel is operatively connected to the leg support. The middle leg is movable to adjust the vertical position of the middle wheel, and the rear leg is movable to adjust the vertical position of the rear wheel. The plurality of telescoping members slide the seat portion in a substantially horizontal direction in relation to the rear rotation axis or the middle rotation axis.

22 Claims, 22 Drawing Sheets

U.S. PATENT DOCUMENTS 5,964,473 A 10/1999 Degonda
6,381,781 B1 5/2002 Bourgraf et al.
6,742,206 B1 * 6/2004 Han .............................. 5/618
6,912,746 B2 * 7/2005 Grove ........................... 5/618
7,025,421 B1 * 4/2006 Fowler et al. .......... 297/354.13
7,055,840 B1 * 6/2006 Kelso ...................... 280/250.1
7,131,151 B2 * 11/2006 Ferneau et al. ................ 5/86.1
7,389,552 B1 * 6/2008 Reed et al. .................... 5/86.1

* cited by examiner

APPARATUS FOR TRANSPORTING AN INVALID

FIELD OF THE INVENTION

The invention relates to transportation devices for disabled people or other invalids. In particular, the invention relates to an apparatus which is adjustable from a chair position to a position which permits the apparatus to transport the invalid to a location or enclosure having a raised surface.

BACKGROUND OF THE INVENTION

The problems associated with transporting disabled people or other invalids are well known. Such persons are often unable to move sufficiently to get out of a wheelchair and lift themselves onto a raised surface such as a vehicle floor. Consequently, invalids must often be transported onto such raised surfaces.

As discussed above, one common example of a transportation obstacle is the transportation of an invalid from a ground surface into a vehicle. In order for an invalid to be transported into a vehicle in a conventional wheelchair, the vehicle may have to be specially modified. Such modification is costly and must be performed for each new vehicle purchased by the invalid.

A number of adjustable chairs for transporting an invalid onto a raised surface, such as a vehicle floor, are known. One such chair is disclosed in U.S. Pat. No. 4,105,242. However, this prior art chair requires the presence of a third party attendant to adjust the chair and to move it onto the raised surface. While adjusting the chair, the attendant is required to bear at least part of the weight of the invalid.

Accordingly, there is a need for an improved invalid transportation apparatus which is capable of transporting an invalid onto a raised surface while reducing the need for third party assistance.

SUMMARY OF THE INVENTION

According to a first aspect of the invention, a transportation apparatus for transporting an invalid onto a raised surface is provided. The transportation apparatus comprises a leg support pivotably connected to a seat portion. At least one middle leg and at least one rear leg depends downwardly from the seat portion. At least one middle wheel is connected to the middle leg and at least one rear wheel is connected to the rear leg. The middle wheel and rear wheel define a middle and rear rotation axes, respectively. At least one front wheel is operatively connected to the leg support. The middle leg is adapted to adjust the vertical position of the middle wheel, and the rear leg is adapted to adjust the vertical position of the rear wheel. The seat portion is adapted for movement in a substantially horizontal direction in relation to the rear rotation axis or the middle rotation axis.

According to a second aspect of the invention, a transportation apparatus for transporting an invalid onto a raised surface is provided. The transportation apparatus comprises a backrest and leg support pivotably connected to a seat portion. The seat portion is slidably connected to first and second spaced apart slide rails. Each slide rail comprises a plurality of telescoping members. At least one middle leg and at least one rear leg depends downwardly from the seat portion. At least one middle wheel is connected to the middle leg and at least one rear wheel is connected to the rear leg. The middle wheel and rear wheel define a middle and rear rotation axes, respectively. At least one front wheel is operatively connected to the leg support. The middle leg is adapted to adjust the vertical position of the middle wheel, and the rear leg is adapted to adjust the vertical position of the rear wheel. The plurality of telescoping members are adapted to slide the seat portion in a substantially horizontal direction in relation to the rear rotation axis or the middle rotation axis.

DETAILED DESCRIPTION OF THE PREFERRED EMBODIMENT

Figure 1:
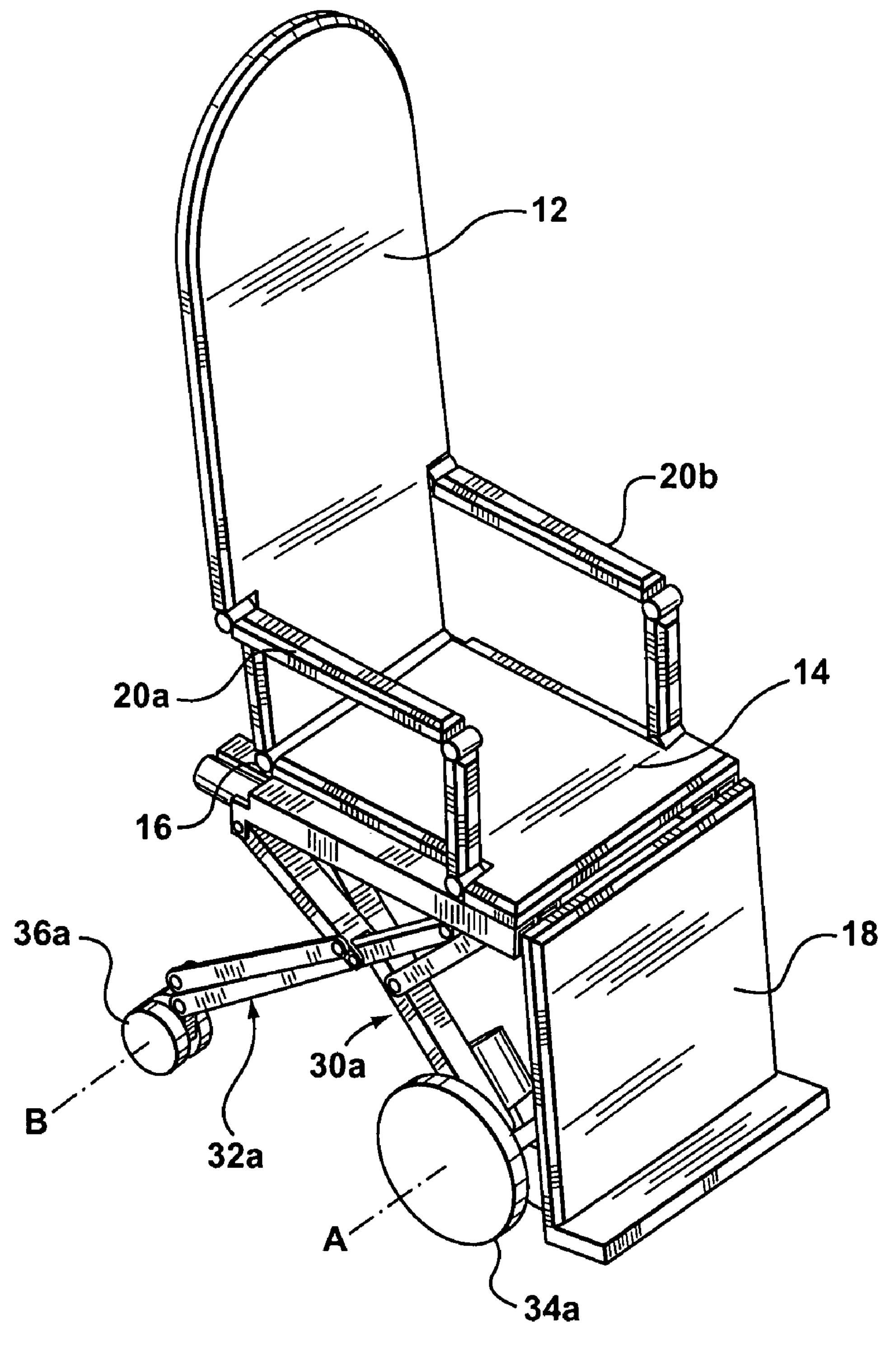
FIG. 1 is a top perspective view of an apparatus for transporting an invalid according to a preferred embodiment of the invention.
Figure 2:
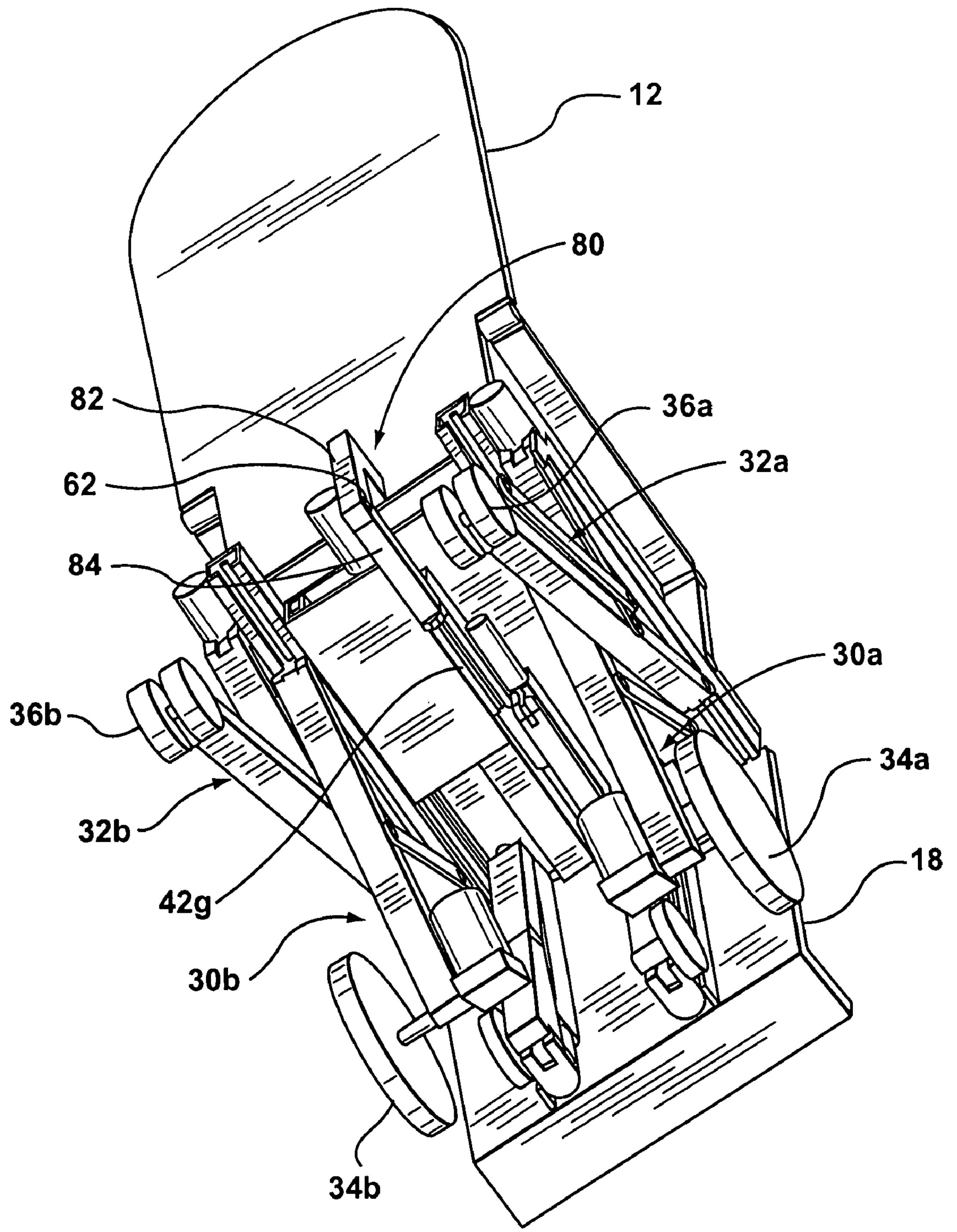
FIG. 2 is a bottom perspective view of the preferred embodiment.

FIGS. 1 and 2 show an apparatus 10 for transporting an invalid according to an embodiment of the present invention. The apparatus includes a pivotable backrest 12 which is connected to a rear edge of a seat portion 14 by a hinge 16. A leg support 18 is pivotably connected to a front edge of the seat portion 14, as described in more detail below. Foldable arm rests 20*a*, 20*b* which connect to the backrest 12 and seat portion 14 may also be provided.

Figure 3:
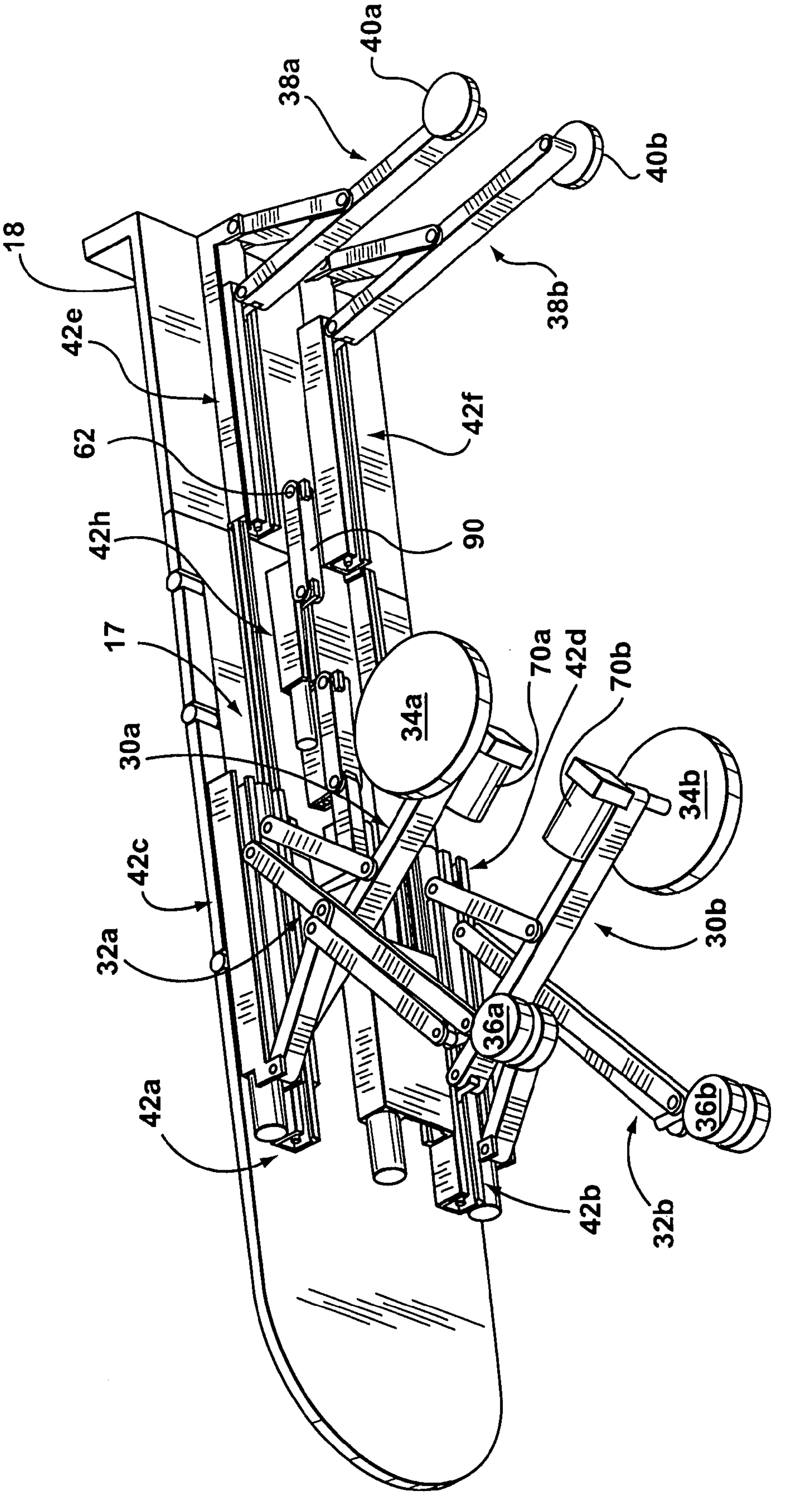
FIG. 3 is a bottom perspective view of the preferred embodiment in the horizontal or stretcher position.

Referring to FIGS. 1 and 3 (which shows the apparatus 10 in a horizontal or stretcher position), the seat portion 14 includes a frame 17. Preferably, a pair of middle legs 30*a,b* and a pair of rear legs 32*a,b* depend downwardly from the frame. Middle wheels 34*a,b* are connected to lower ends of middle legs 30*a,b*, respectively. Rear wheels 36*a,b* are connected to lower ends of rear legs 32*a,b*, respectively. The middle wheels 34*a,b* define a rotation axis A, and the rear wheels 36*a,b* define a rotation axis B. Rotation axes A and B are shown in FIG. 1. Preferably, the rear wheels, 36*a,b* are conventional swiveling wheels.

Referring now to FIG. 3, a pair of front legs 38*a,b* are also preferably provided on the leg support 18. Front wheels 40*a,b* are connected to lower ends of front legs 38*a,b*. Preferably, front wheels 40*a,b* are able to roll only in a forward direction (i.e. the front wheels are prevented from rolling backward) by any suitable means, such as anti-reverse bearings (not shown). It will be understood by those skilled in the art that the apparatus 10 may be constructed without front legs 38*a,b*. In an alternative embodiment, the front wheels 40*a,b* may be mounted directly to the underside of leg support 18.

Continuing to refer to FIG. 3, leg worm drives 42*a-f* are provided to extend (i.e. lower) and retract (i.e. raise) middle legs 30*a,b*, rear legs 32*a,b*, and front legs 38*a,b*, respectively.

The leg worm drives 42*a-d* which move the middle legs 30*a,b* and rear legs 32*a,b* are mounted to the sides of the frame 17. The leg worm drives 42*d,f* which drive the front legs are mounted to the underside of the leg support 18.

Figure 4:
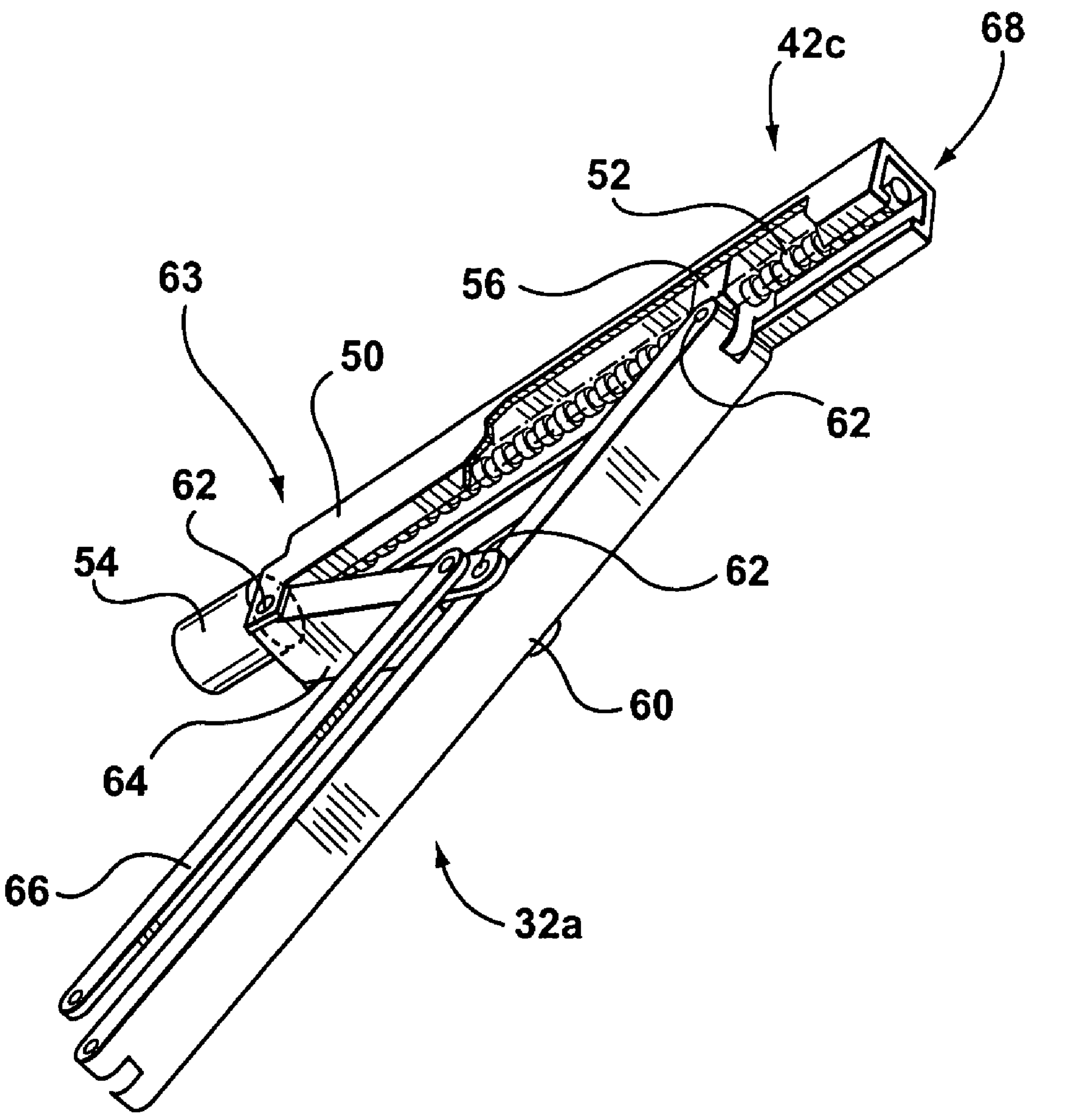
FIG. 4 is a partial cutaway perspective view of the preferred embodiment showing a rear leg and worm drive for the rear leg.

FIG. 4 shows leg worm drive 42*c* and rear leg 32*a* in detail. Leg worm drive 42*c* includes a worm housing 50 which receives a threaded worm rod 52. A conventional electric motor 54 which drives the worm rod 52 is mounted at one end of the worm housing 50. An internally threaded worm follower 56 engages the worm rod 52. The rotation of the worm rod 52 by electric motor 54 causes the worm follower 56 to move outwardly or inwardly along the worm rod 52 (depending on the direction of the rotation of the worm rod). Preferably, all of the leg worm drives 42*a-f* are substantially identical to leg worm drive 42*c*. Consequently, the remaining leg worm drives are not illustrated in detail.

Continuing to refer to FIG. 4, rear leg 32*a* is suspended from worm drive 42*c*. Rear leg 32*a* includes a primary member 60 which is hinged to the worm follower 56 at its upper end in any suitable fashion, such as by pin hinge 62. At its bottom end, the primary member 60 is connected to rear wheel 36*a* (shown in FIG. 3) also by pin hinge 62. A secondary member 64 is hinged by pin hinge 62 to a proximate end 63 of the worm housing 50 at one end and to a point along the length of primary member 60 at the other end. A support member 66 is hinged to a lower end of the secondary member 64 and extends generally parallel with primary member 60. The lower end of support member 66 is connected to rear wheel 36*a* (shown in FIG. 3). The movement of the worm follower 56 toward the proximate end 63 of the worm drive 42*c* causes the hinged assembly of primary member 60 and secondary member 64 to extend downwardly away from the worm drive. The movement of the worm follower 56 toward the distal end 68 causes the hinged assembly of primary member 60 and secondary member 64 to retract upwardly toward the worm drive. The extension and retraction of the primary member 60 of the rear leg 32*a* in turn raises and lowers the rear wheel 36*a*. The support member 66 acts to maintain the orientation of the rear wheel 36*a* in relation to the ground or floor surface.

Preferably, the rear leg 32*b* is identical to rear leg 32*a* and will not be further described. The remaining legs (middle legs 30*a,b* and front legs 38*a,b*) are preferably similar to rear leg 32*a*, with the difference being that the remaining legs are constructed without support member 66. It will be understood by those skilled in the art that the legs 30*a,b*, 32*a,b*, and 38*a,b* may be constructed in any other suitable fashion which permits such legs to be extended and retracted. For example, the legs may be constructed from telescoping members.

Referring again to FIG. 3, electric motors 70*a,b* are mounted on the middle legs 30*a,b*, respectively, in order to drive middle wheels 34*a,b*. The electric motors driving the middle wheels 34*a,b* permit the apparatus 10 to be self-propelled. In other words, the invalid can operate the apparatus without assistance from an attendant.

Referring again to FIG. 2, a backrest tilting arm 80 is connected to a rear surface of the backrest 12. The other end of the backrest tilting arm 80 is connected to a backrest worm drive 42*g*. The backrest worm drive 42*g* is substantially identical to the leg worm drive 42*c* and will not be further described. The backrest tilting arm 80 preferably comprises a first member 82 (secured to backrest 12) hinged to a second member 84 by pin hinge 62. The other end of the second member 84 is connected to the worm follower 56 (shown in FIG. 4) of backrest worm drive 42*g* also by pin hinge 62. Accordingly, backrest worm drive 42*g* moves the backrest tilting arm 80, which in turn tilts the backrest 12.

Referring again to FIG. 3, a leg support tilting arm 90 is provided to raise and lower the leg support 18. One end of leg support tilting arm 90 is connected to the underside of leg support 18 by pin hinge 62. The other end of leg support tilting arm 90 is connected to worm follower 56 (shown in FIG. 4) of a leg support worm drive 42*h*. The leg support worm drive 42*h* is substantially identical to the leg worm drive 42*c* and will not be further described. The leg support worm drive 42*h* moves the leg support tilting arm 90 to raise and lower the leg support 18.

Figure 5:
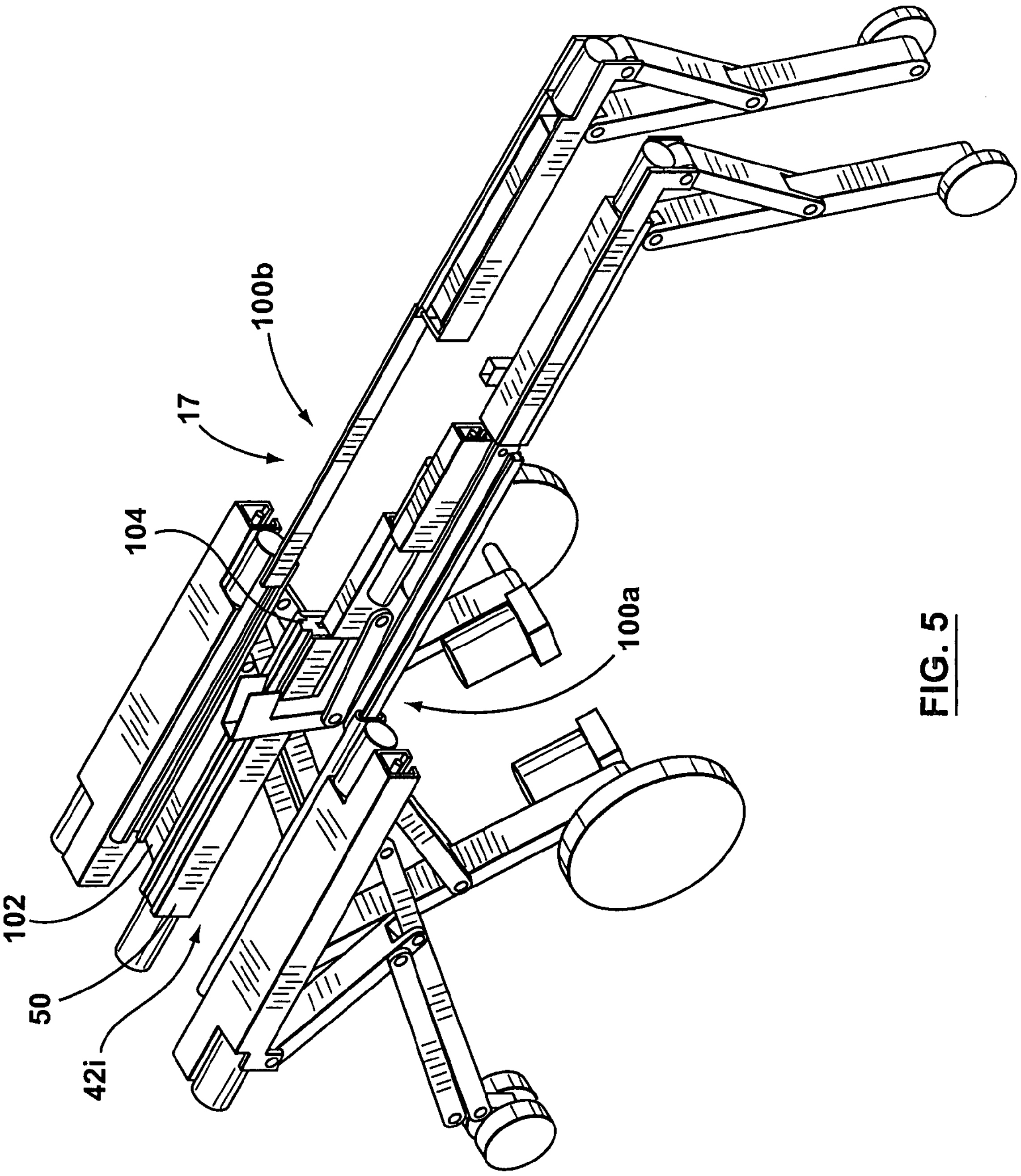
FIG. 5 is a partial perspective view of the preferred embodiment with the seat portion, backrest, and leg support removed.

Referring to FIG. 5, the frame 17 preferably comprises two telescoping slide rails 100*a*, 100*b* running along opposing sides of the seat portion 14 (not shown in FIG. 5 for clarity). A seat worm drive 42*i* is provided to slide the seat portion 14 on slide rails 100*a*, 100*b*. The worm housing 50 of seat worm drive 42*i* is secured to slide rail 100*b* by bracket 102. The worm follower 56 of seat worm drive 42*i* is secured to the underside the seat portion 14 by connector 104.

Figure 6:
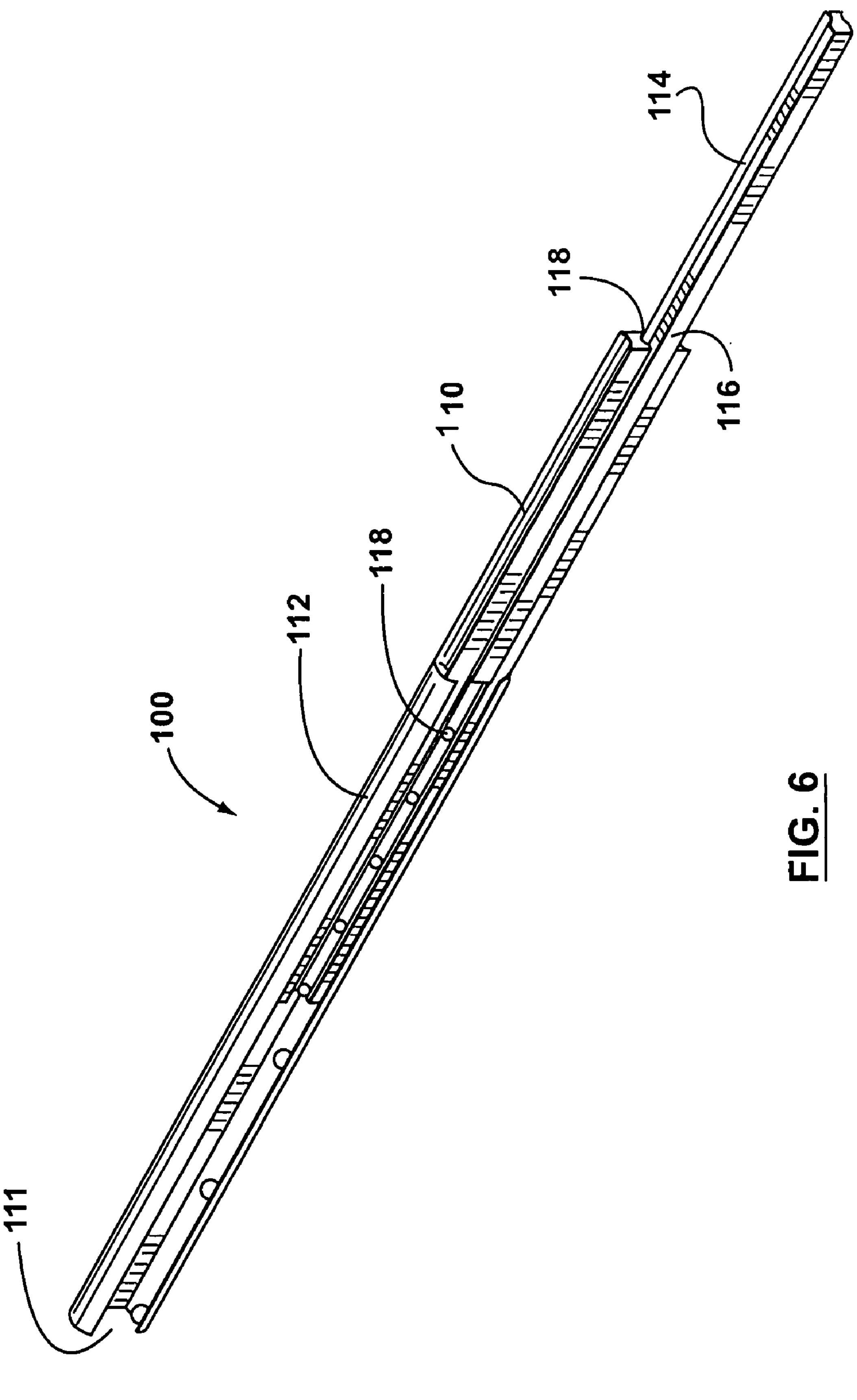
FIG. 6 is a partial perspective view of the preferred embodiment showing a sliding rail.

Referring now to FIG. 6, each slide rail 100*a*, 100*b* preferably comprises three telescoping members to permit the seat portion 14 (shown in FIG. 1) to translate by a distance of preferably at least 100% of its length. In particular, a middle 110 rail is received within a channel 111 of an outer rail 112. An inner rail 114 slides within another channel 116 of the middle rail 110. Bearings 118 may be provided to facilitate the sliding movement. The sliding rails 100*a*, 100*b* permit the seat worm drive 42*i* to slide the seat portion 14 forward and backward in relation to the rotation axis A, B of the middle wheels 34*a,b* and rear wheels 36*a,b*. The seat worm drive 42*h* is substantially identical to the leg worm drive 42*c* and will not be further described.

A battery (not shown) and any suitable control system (not shown), such as a conventional electronic control system may be provided to operate electric motors 70*a*, 70*b* and the worm drives 42*a-i*. The battery or batteries may be mounted under the seat portion 14 or behind the backrest 12. The electronic control system may be linked to an actuator module (not shown) operated by the invalid. The actuator module may be mounted on the armrests 20. The actuator module may include one or more joysticks or levers to control the various movements (described above) of the apparatus 10.

It will be understood by those skilled in the art that use of the worm drives 42*a-i* is not essential. Any other suitable mechanism (such as hydraulics, servo motors, or the like) may be used to move the legs 30, 32, 38, backrest 12, leg support 18, and seat portion 14.

The operation of the preferred embodiment of the present invention will now be described with reference to FIGS. 7A-J and 8A-F. The operation will be described in connection with the apparatus 10 entering and exiting a vehicle. However, it will be understood by those skilled in the art that the apparatus 10 may exit or enter any other raised surface (either enclosed or not) in the same manner.

The operation of the apparatus 10 in connection with entering the vehicle will be described first with reference to FIGS. 7A-J.

Figure 7A:
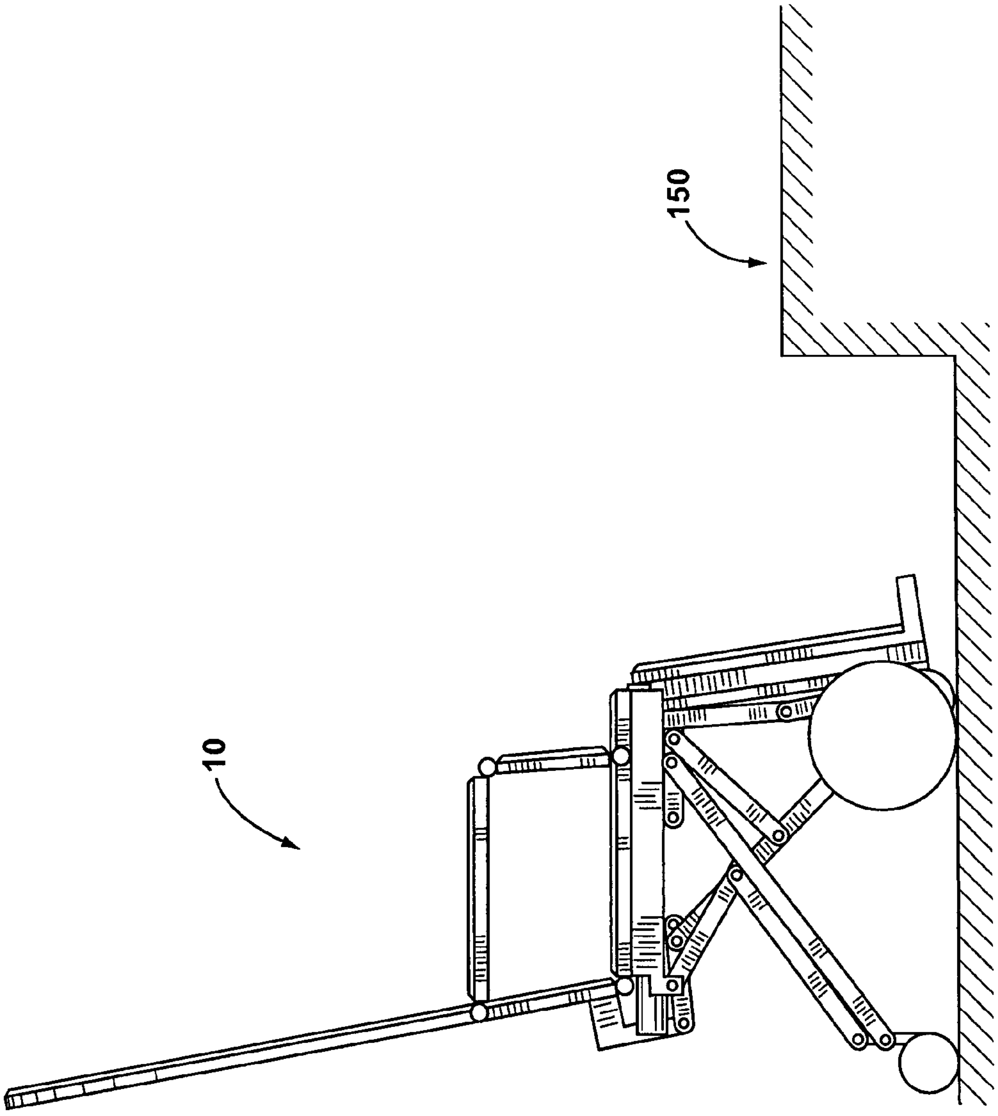
FIGS. 7A-J are a series of elevation views of the preferred embodiment illustrating entrance of the apparatus on a raised surface.

The apparatus 10 is typically in the position shown in FIG. 7A for wheelchair operation. When the invalid wishes to transport herself onto a vehicle or other raised surface, the invalid first drives the apparatus 10 forward in proximity of the raised surface 150.

Figure 7B:
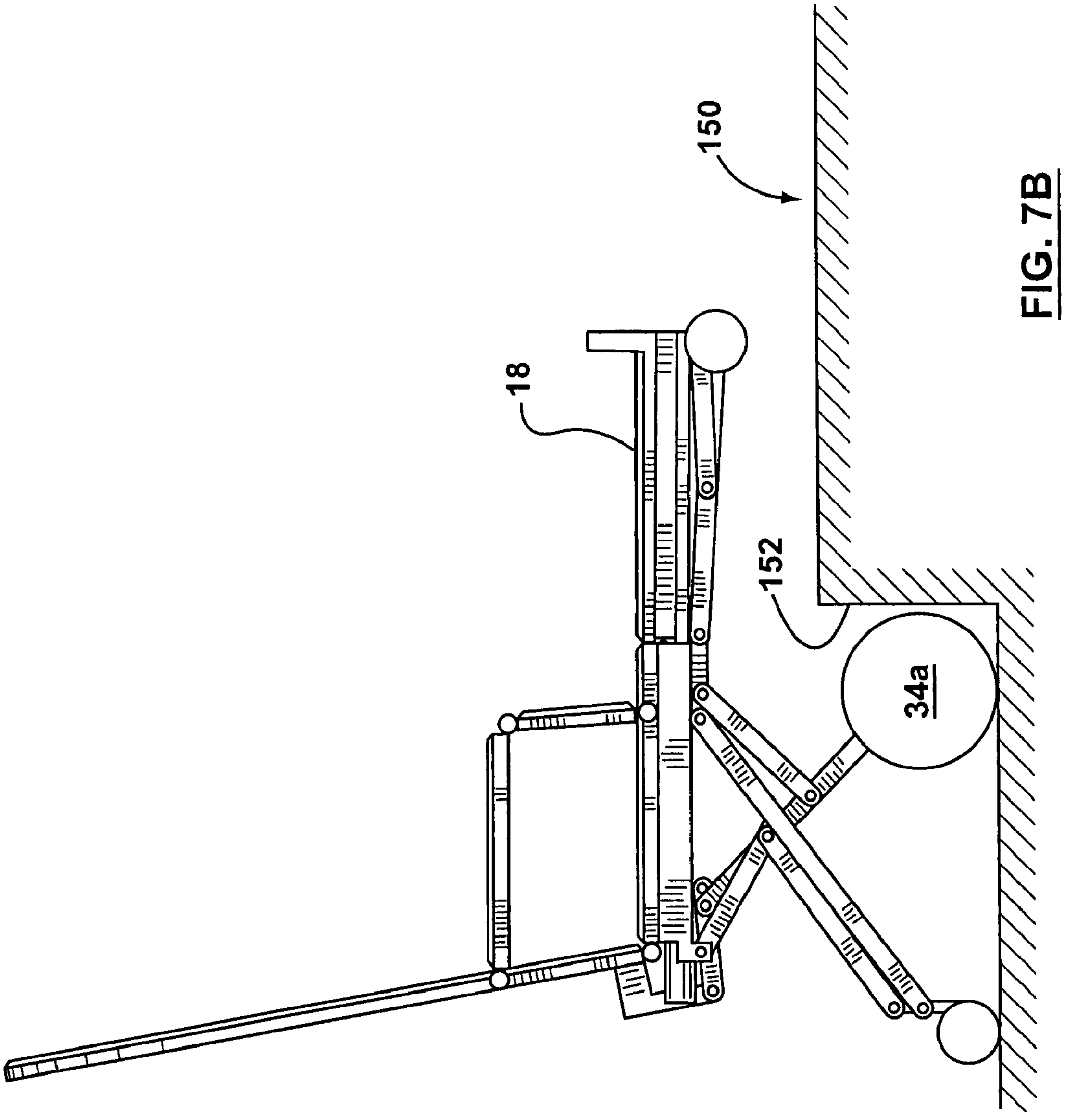

Referring to FIG. 7B, the invalid raises the leg support 18 into a substantially horizontal position and drives the apparatus forward until the middle wheels 34*a*, 34*b* are adjacent to the edge 152 of the raised surface 150.

Figure 7C:
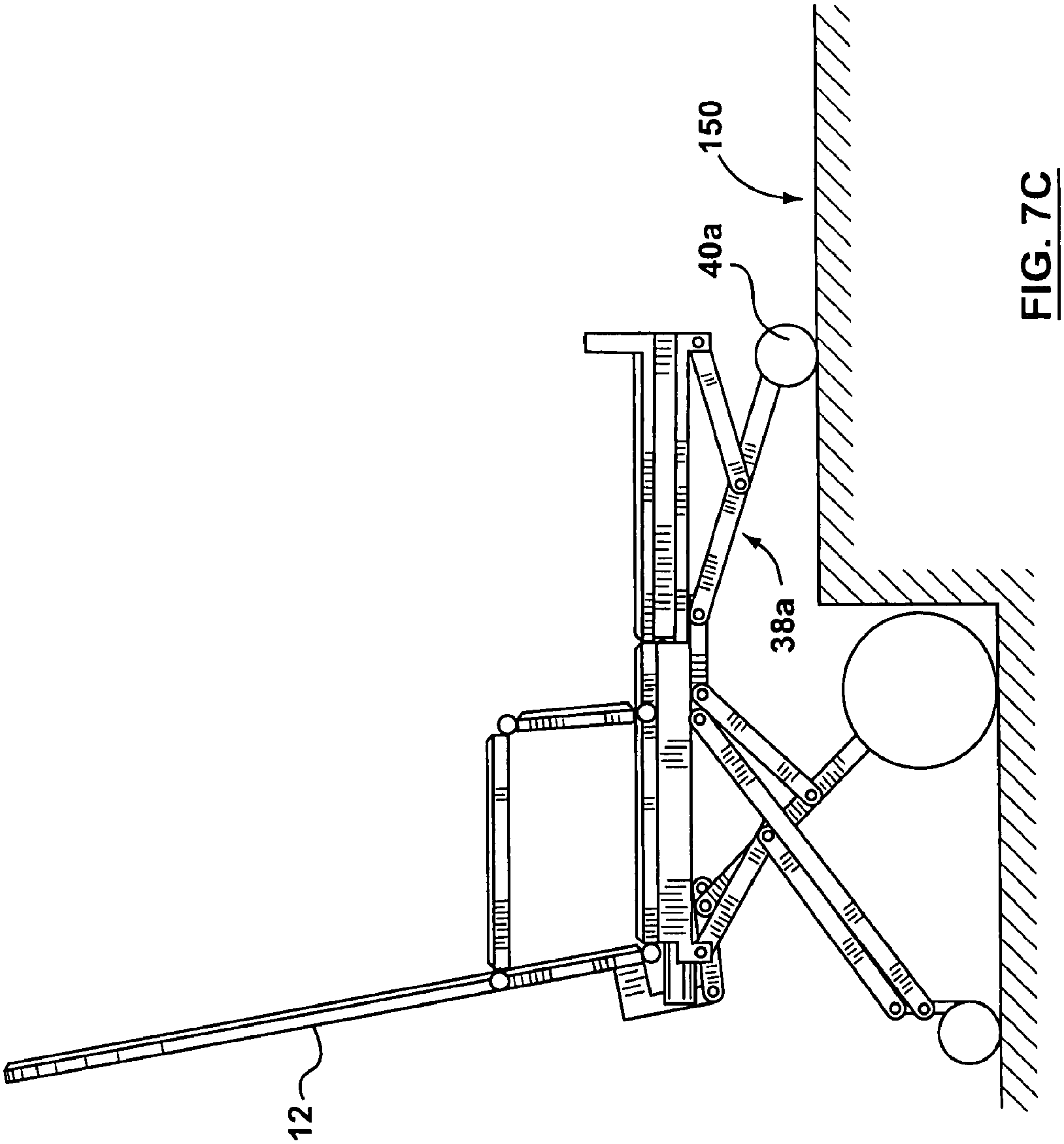

Referring to FIG. 7C, front legs 38*a*, 38*b* then extend to lower front wheels 40*a,b* onto the raised surface 150. If required due to height restrictions (such as a vehicle roof, the backrest 12 may be lowered (not shown in lowered position) to a height sufficient to clear vehicle roof or to a horizontal stretcher position at this stage.

Figure 7D:
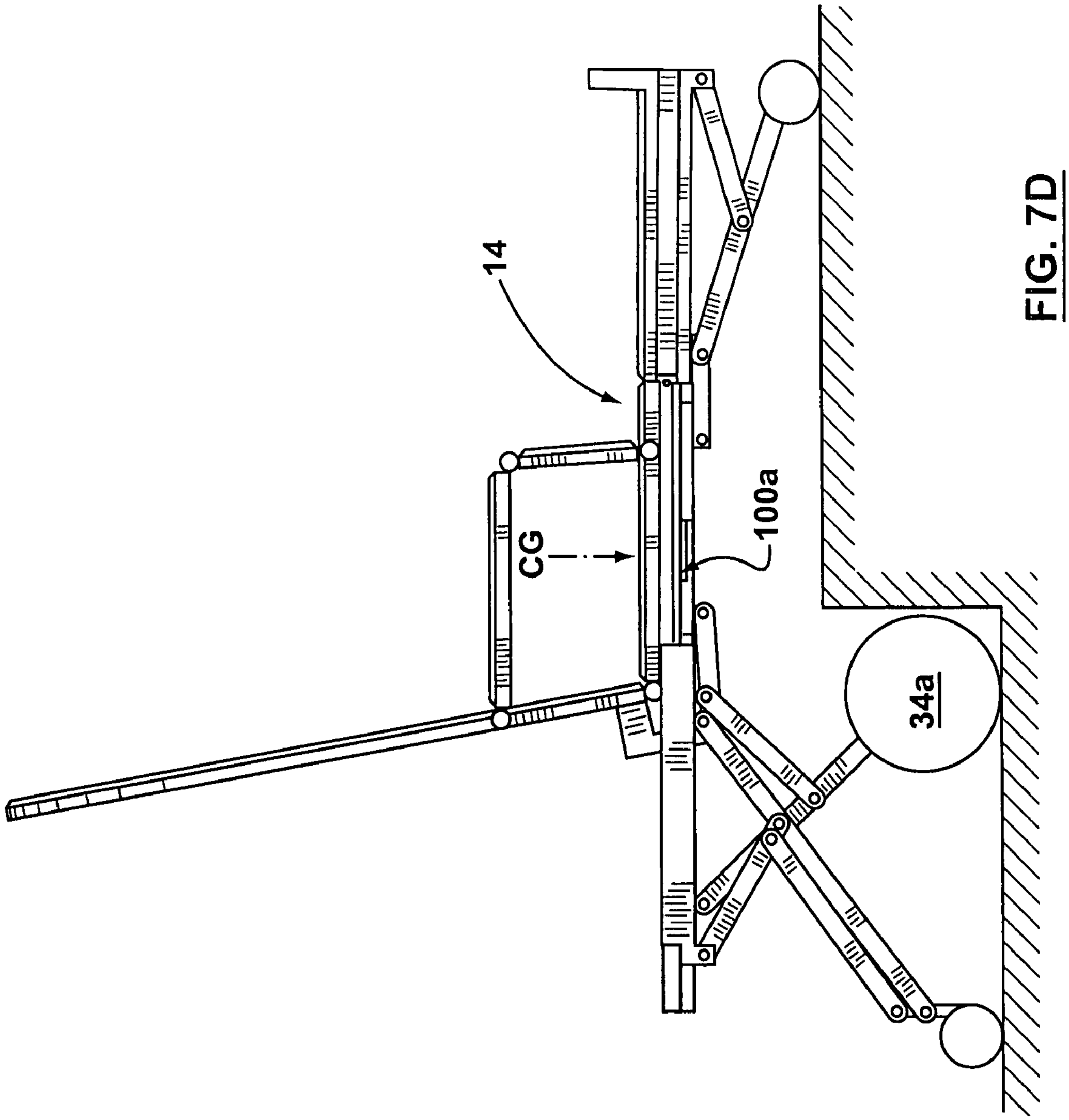

Referring now to FIG. 7D, the slide rails 100*a,b* extend to slide seat portion 14 forward relative to the rotational axis A (shown only in FIG. 1) of middle wheels 34*a,b* until the center of gravity of the invalid is preferably located forward of the rotational axis A. The force of the mass of the invalid acting through the center of gravity is indicated on FIG. 7D by arrow CG.

Figure 7E:
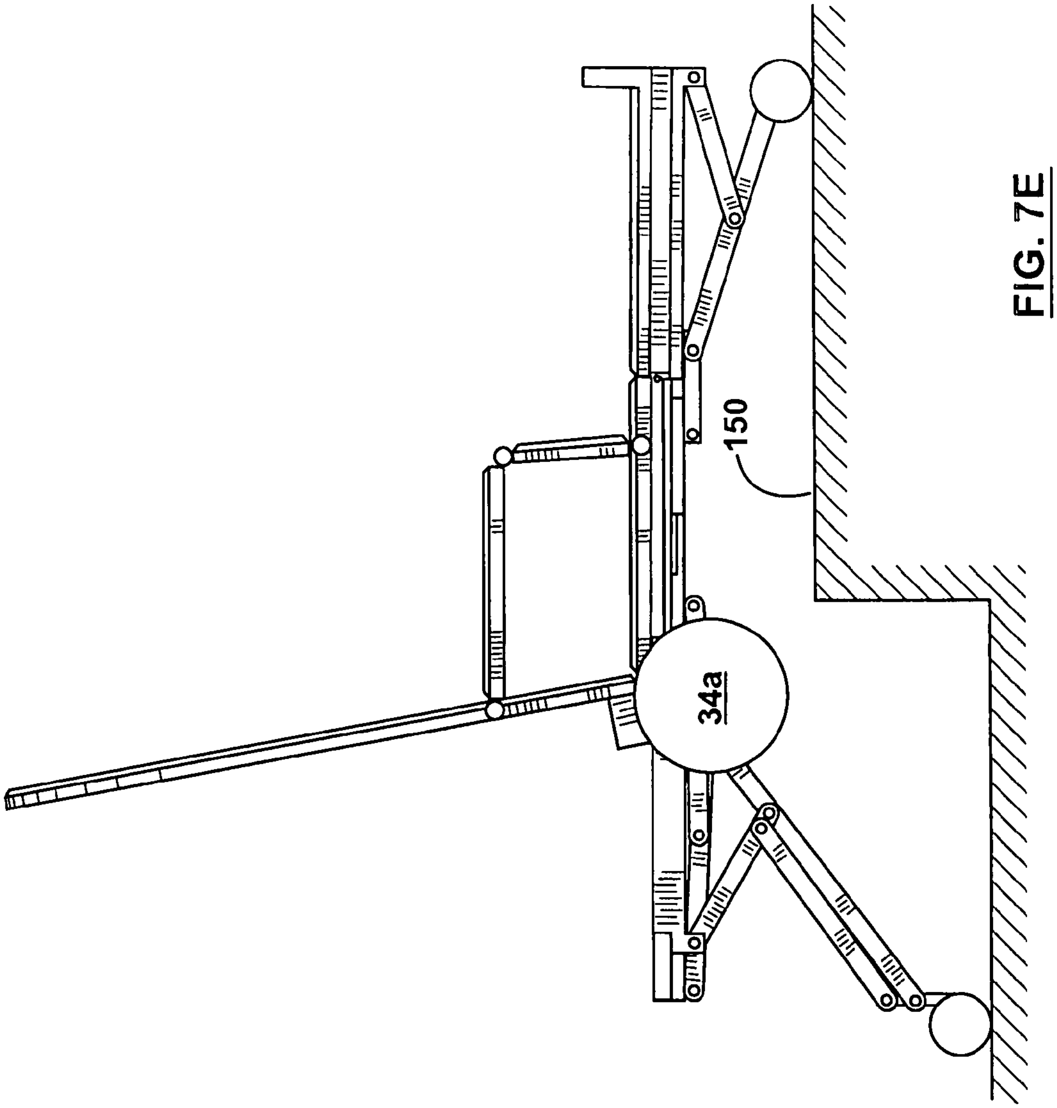

Referring to FIG. 7E, the middle wheels 34*a,b* are then raised to a height above the raised surface 150.

Figure 7F:
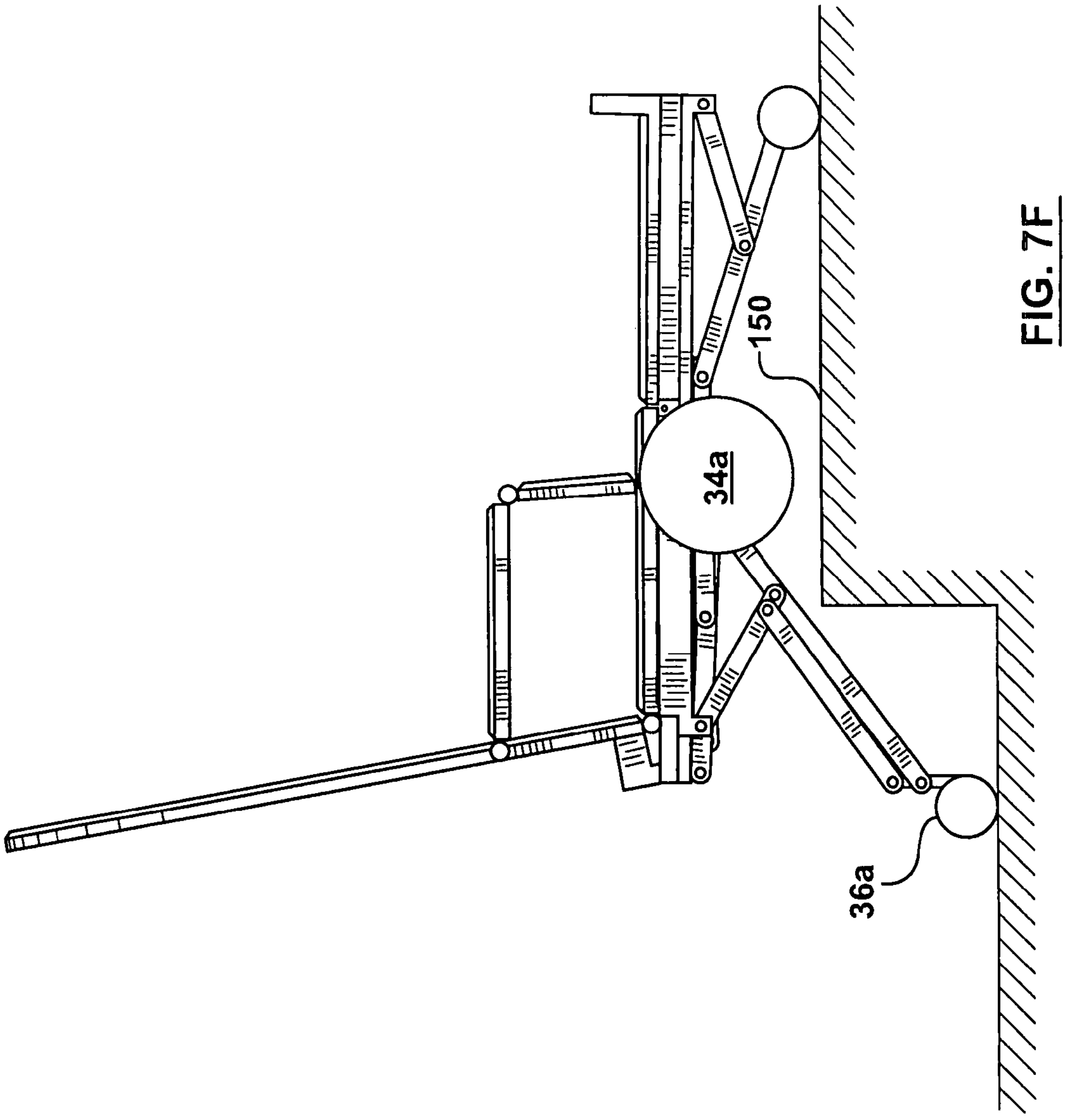

Referring to FIG. 7F, the slide rails 100*a,b* (not shown in FIG. 7F) retract causing the middle wheels 34*a,b* and rear wheels 36*a,b* to roll forward, such that middle wheels 34*a,b* are above the raised surface 150. At the same time, the seat portion slides backward relative to rotational axis A (shown only in FIG. 1). All of this occurs due to the fact that the front wheels 40*a,b* are prevented from rolling backwards by the anti-reverse bearings.

Figure 7G:
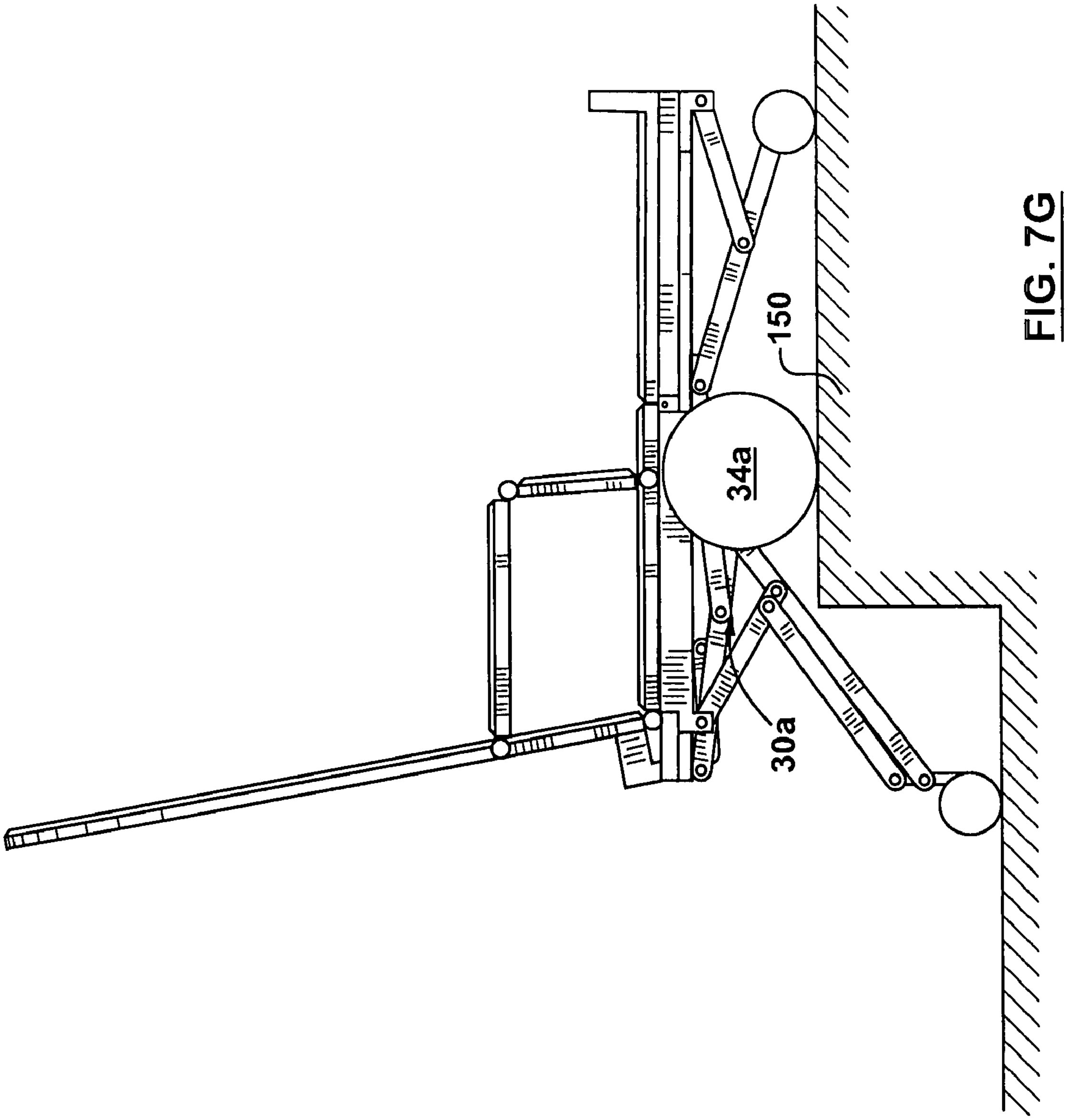

Referring to FIG. 7G, middle legs 30*a,b* then lower the middle wheels 34*a,b* such that they are in contact with the raised surface 150.

Figure 7H:
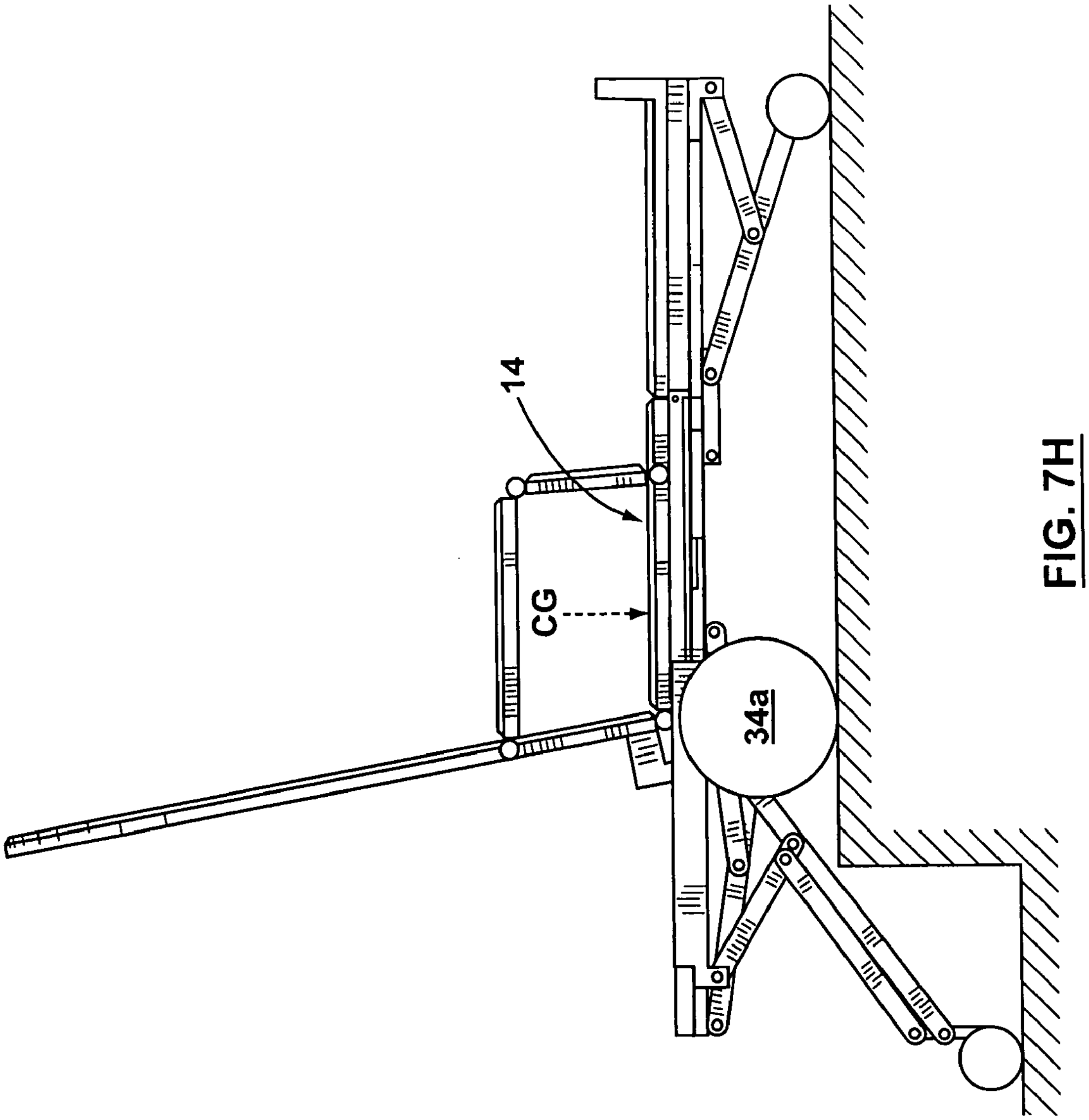

Referring to FIG. 7H, the seat portion 14 again slides forward relative to the rotational axis A of middle wheels 34*a,b* such that the center of gravity CG of the invalid is forward of the rotational axis A.

Figure 7I:
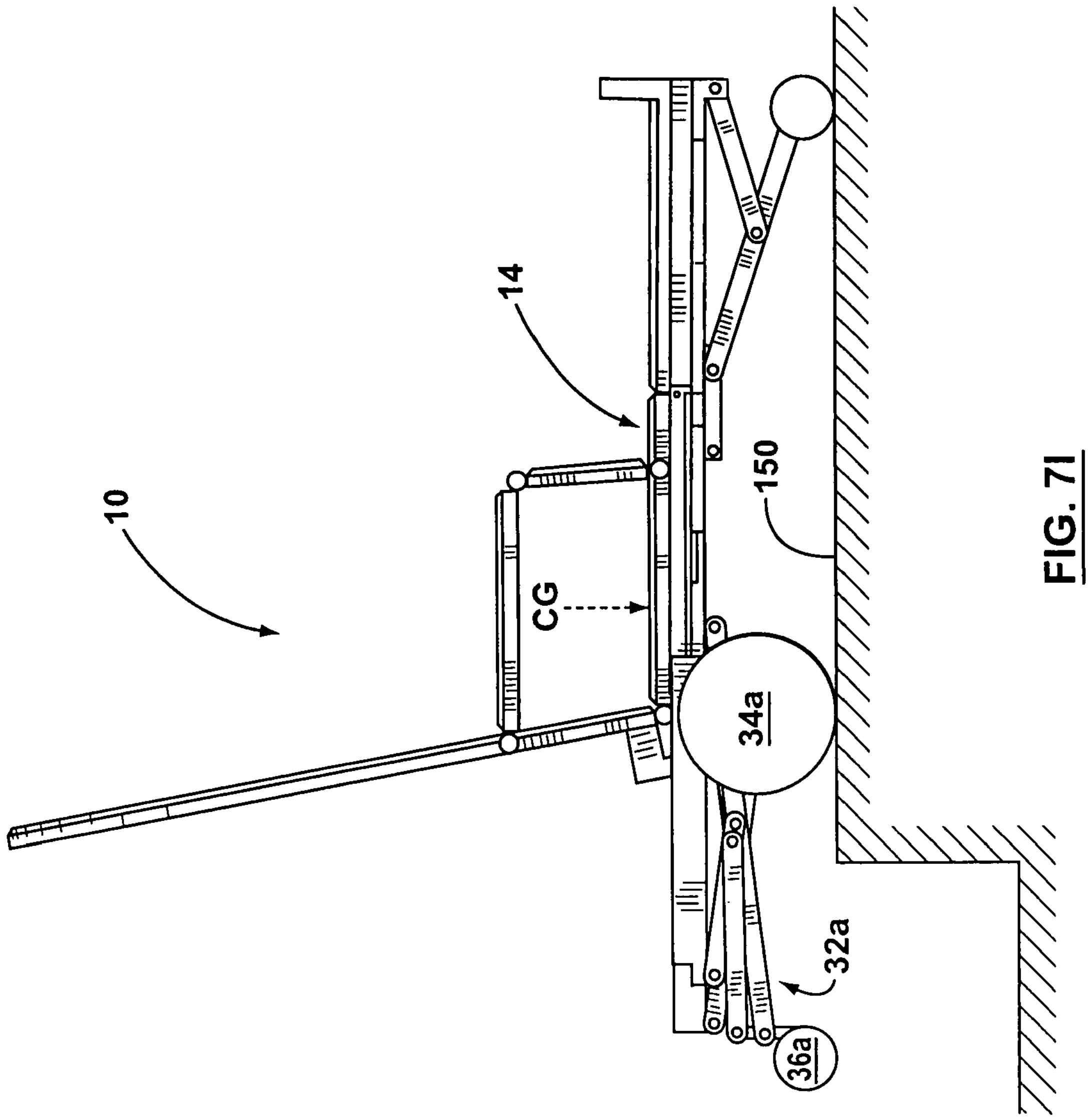

Referring to FIG. 7I, the rear legs 32*a,b* retract rear wheels 36*a,b* to a height above the raised surface. The apparatus 10 drives forward to a position where the rear wheels 36*a,b* are above the raised surface.

Figure 7J:
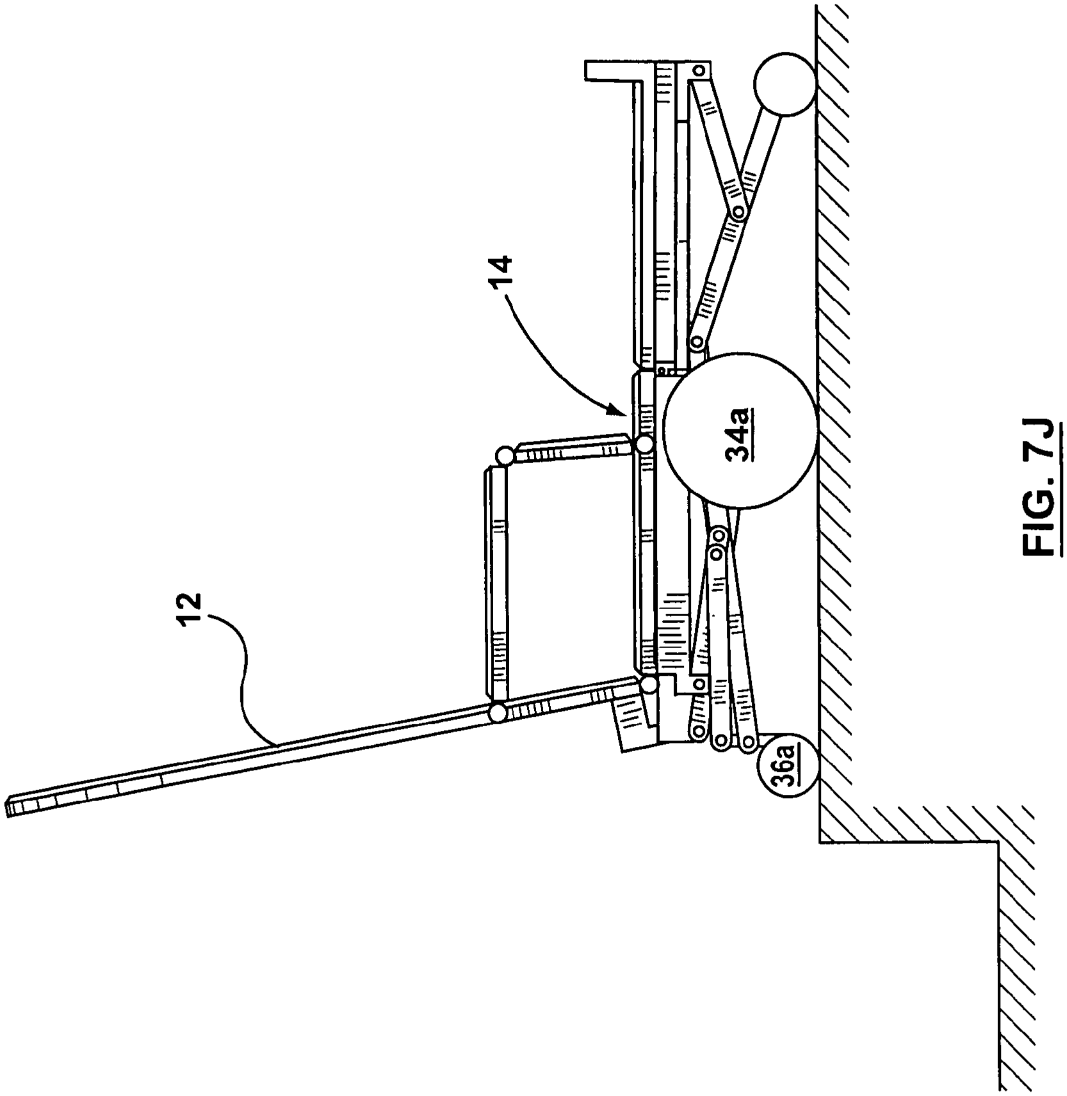

Referring to FIG. 7J, the rear wheels 36*a,b* are then lowered until they are in contact with the raised surface. The slide rails 100*a,b* are retracted such that the middle wheels 34*a,b* and rear wheels 36*a,b* again roll forward on the raised surface. The seat portion 14 moves backward relative to rotation axis A to position the center of gravity CG of the invalid between the middle and rear wheels. In addition, depending on the height of the vehicle roof, the backrest 12 may be adjusted for comfort of the invalid.

The operation of the apparatus 10 in connection with exiting the vehicle will now be described with reference to FIGS. 8A-F.

Figure 8A:
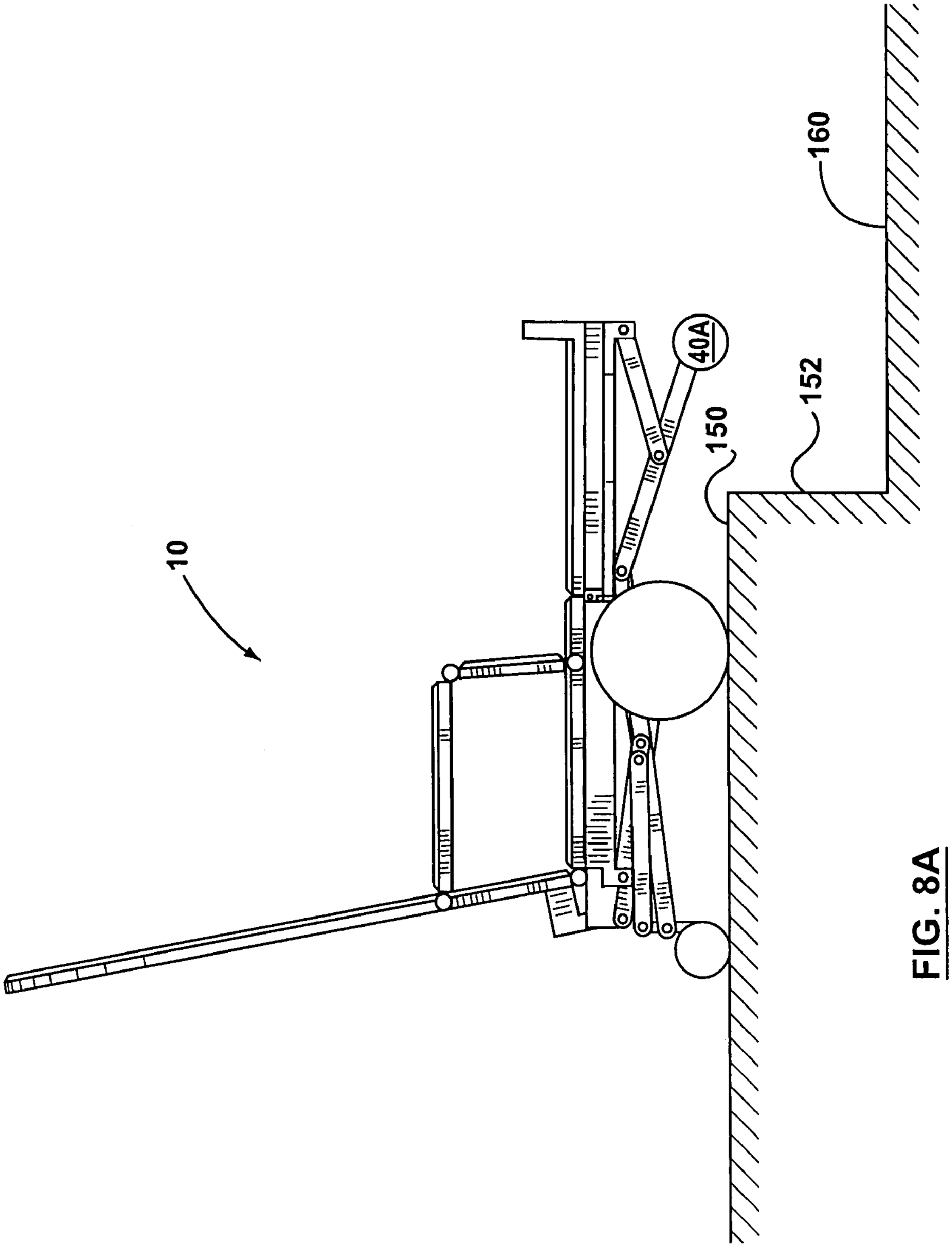
FIGS. 8A-F are a series of elevation views of the preferred embodiment illustrating exit of the apparatus from a raised surface.

Referring to FIG. 8A, the apparatus 10 is driven forward until the front wheels 40*a,b* overhang the edge 152 of the raised surface 150. The front wheels 40*a,b* are then lowered until they are in contact with the ground surface 160.

Figure 8B:
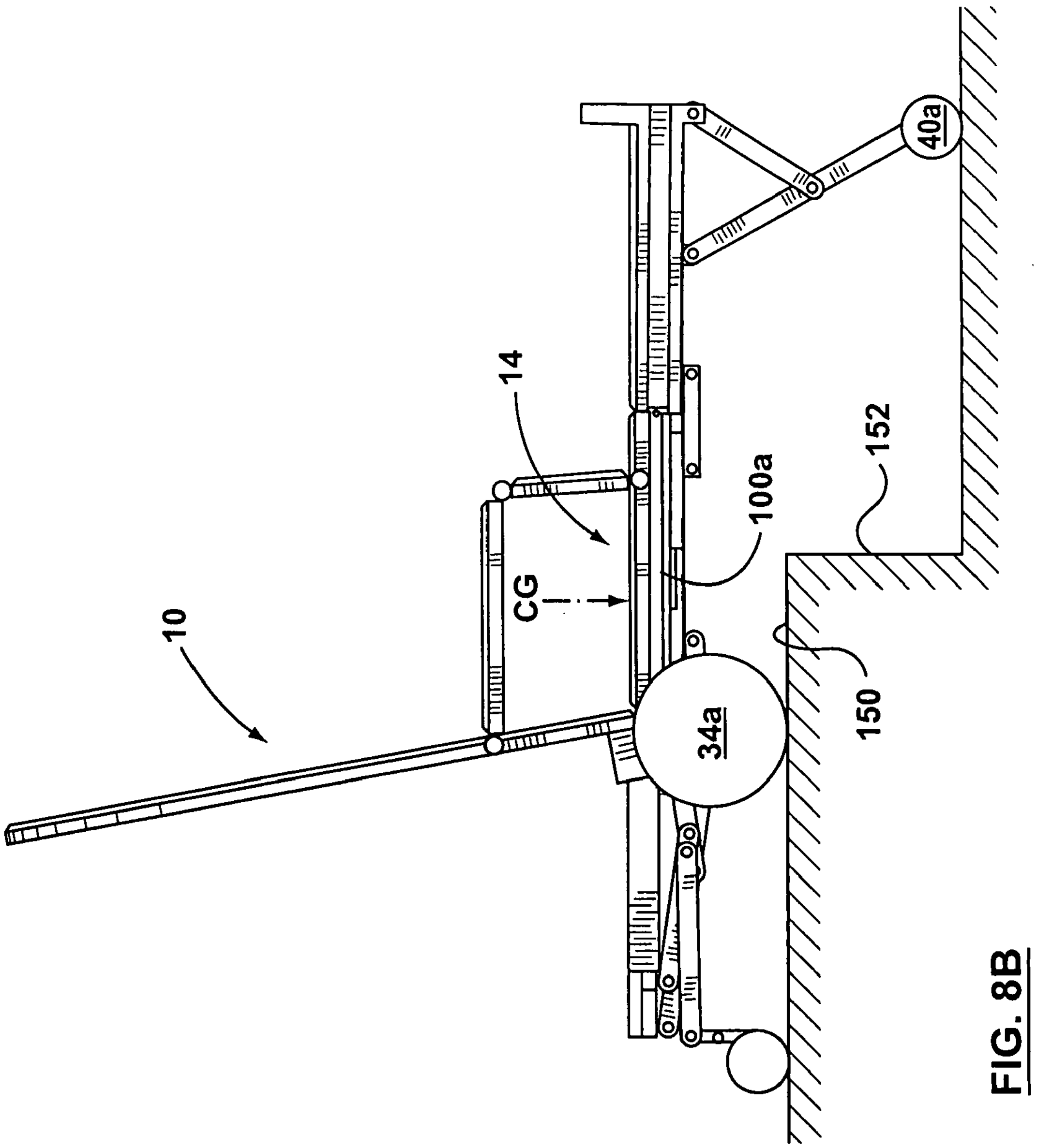

Referring to FIG. 8B, the seat portion 14 then slides forward on slide rails 100*a,b* until the center of gravity CG of the invalid is forward of rotation axis A of middle wheels 34*a,b*. This causes the front wheels 40*a,b* to move forward, further away from the edge 152 of the raised surface 150.

Figure 8C:
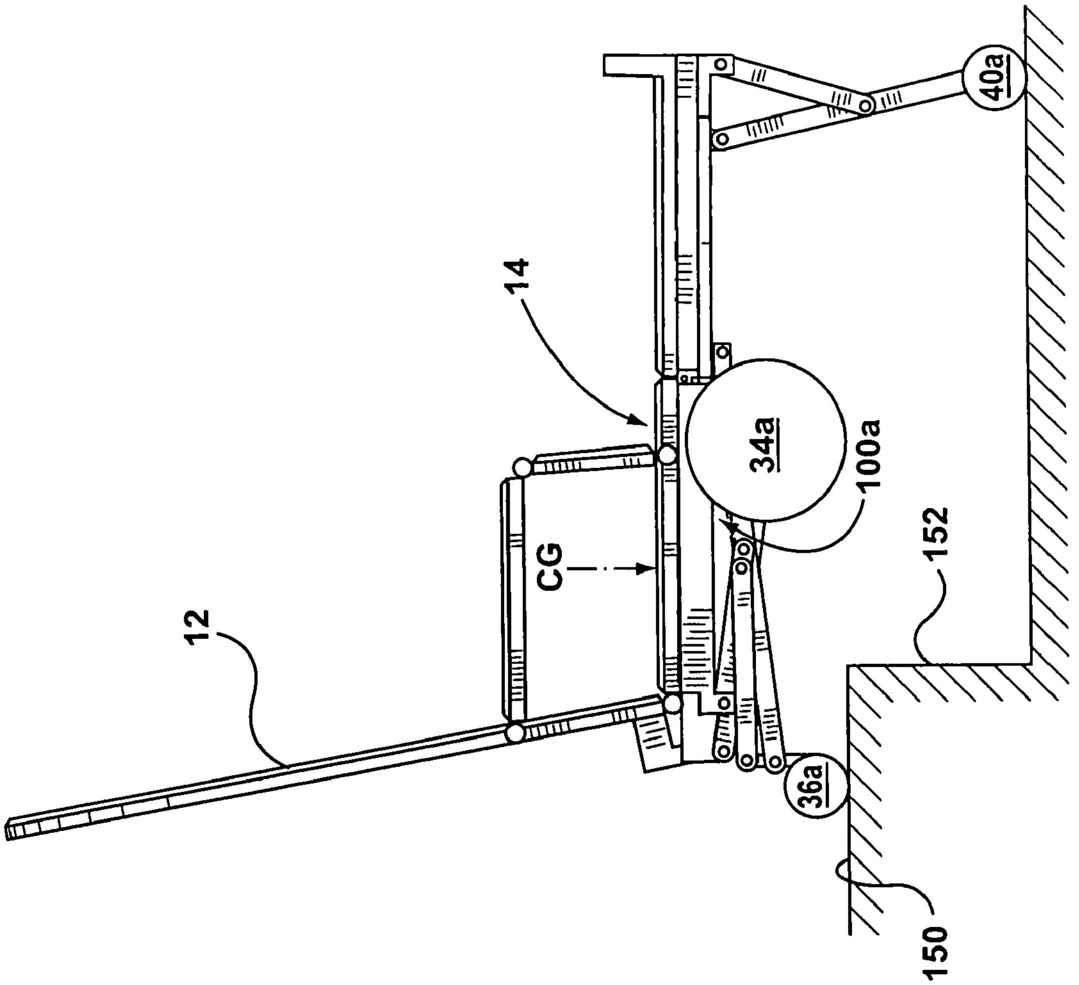

Referring to FIG. 8C, the slide rails 100*a,b* retract causing the middle wheels 34*a,b* and rear wheels 36*a,b* to roll forward due to the anti-reverse bearing on the front wheels 40*a,b*. As a result, the middle wheels 34*a,b* overhang the edge 152 of the raised surface 150. The center of gravity CG of the invalid is positioned between the rotation axes A and B (shown only in FIG. 1) of the middle and rear wheels, respectively.

Figure 8D:
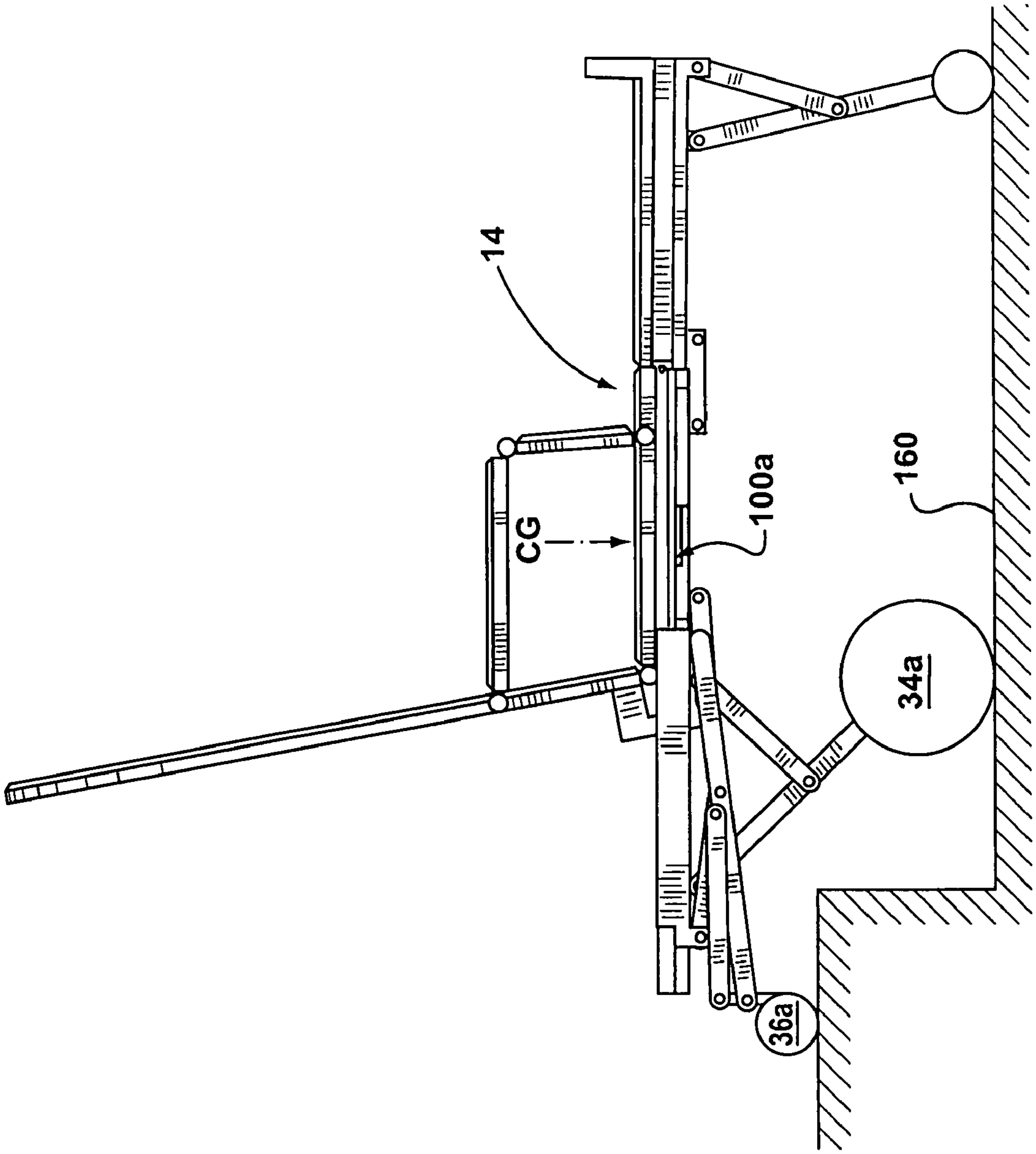

Referring to FIG. 8D, the middle wheels 34*a,b* are then lowered until they are in contact with the ground surface 160. The slide rails 100*a,b* again extend to slide the seat portion 14 forward such that the center of gravity CG of the invalid is forward of rotation axis A.

Figure 8E:
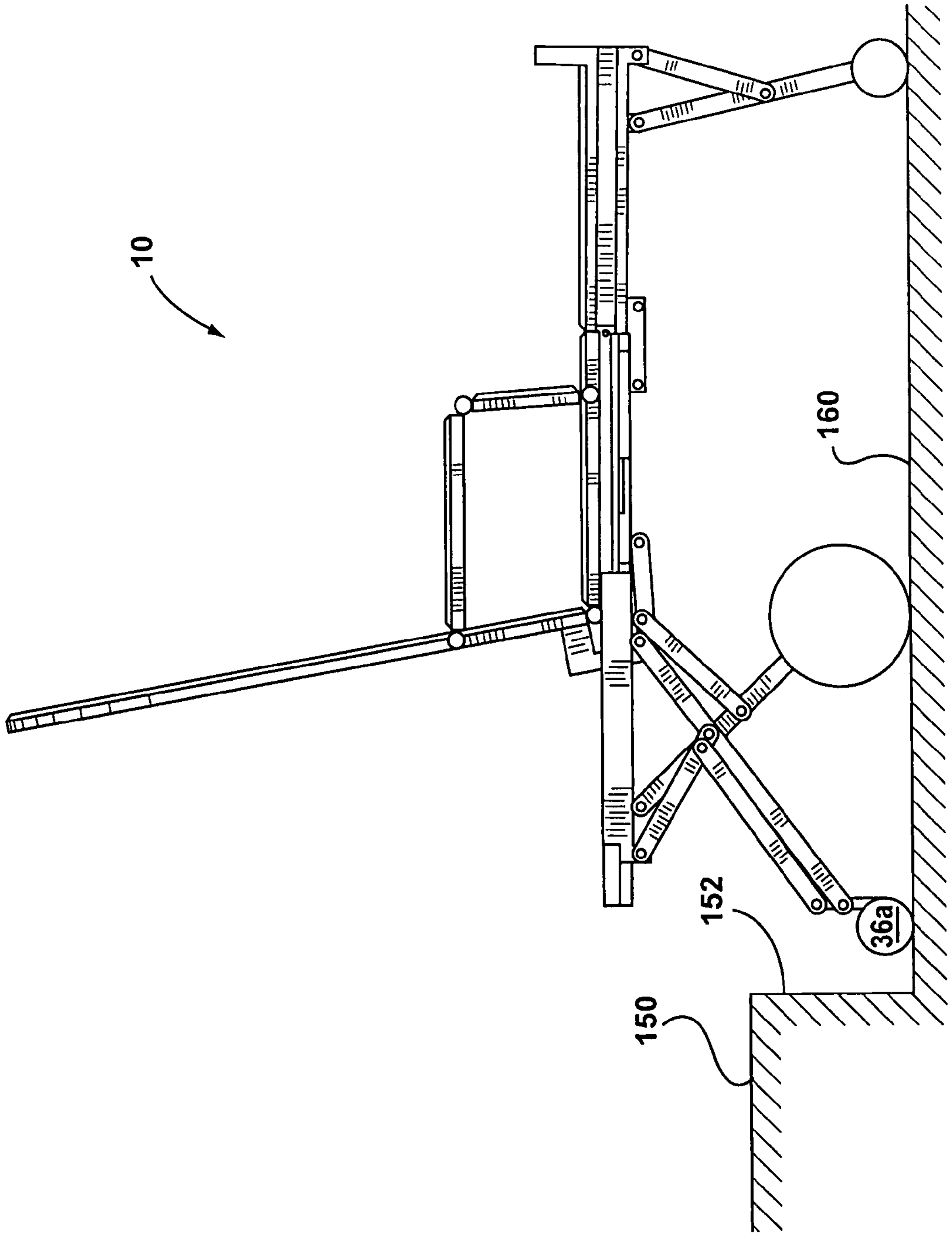

Referring to FIG. 8E, the apparatus 10 then drives forward until the rear wheels 36*a,b* clear the edge 152 of the raised surface 150. The rear wheels are lowered until they are in contact with the ground surface 160.

Figure 8F:
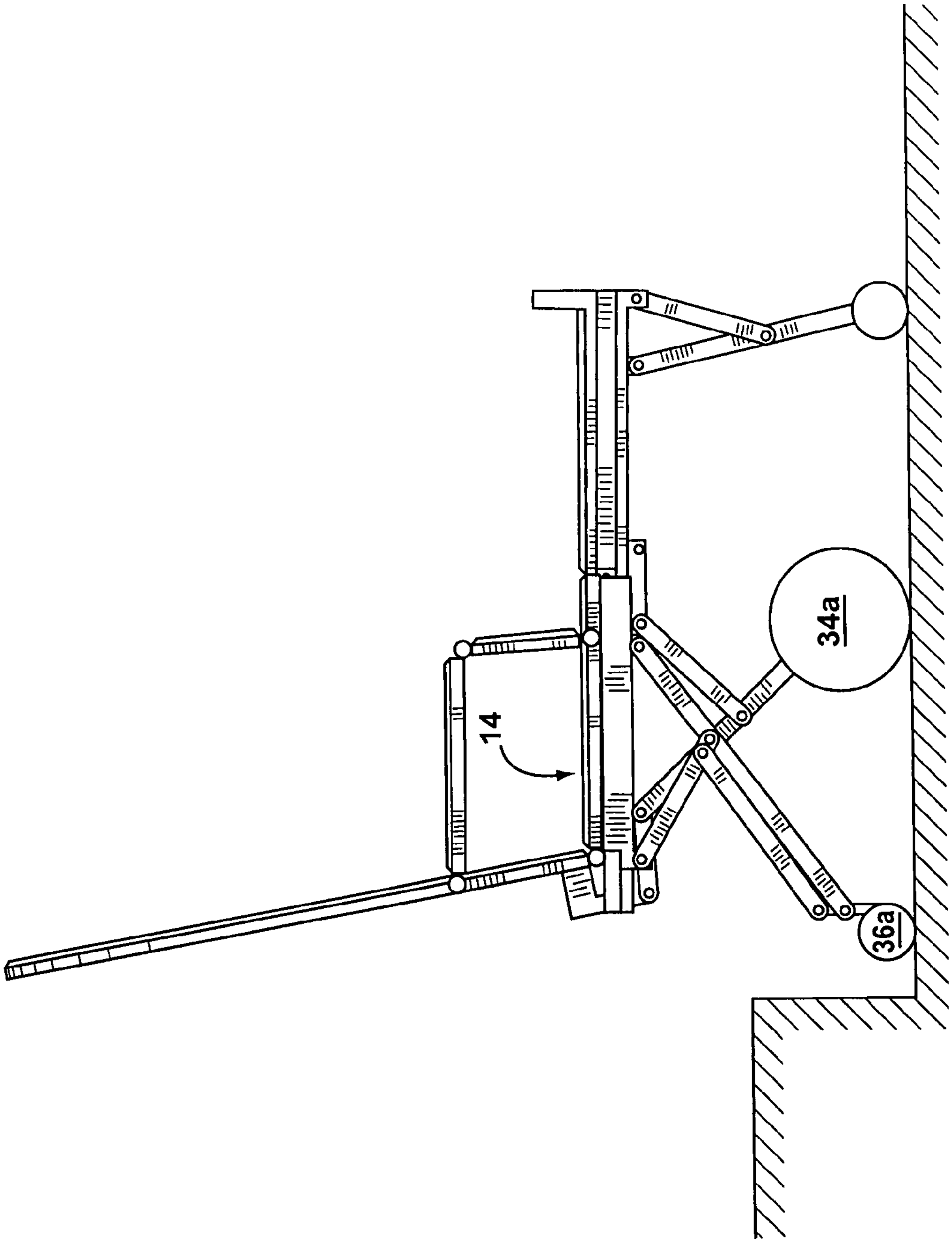

Referring to FIG. 8F, the slide rails 100*a,b* again retract causing the middle wheels 34*a,b* and rear wheels 36*a,b* to roll forward on the ground surface and causing the seat portion 14 to slide backward in relation to rotational axis A.

The front wheels 40*a,b* are then retracted and the leg support 18 is lowered to place the apparatus 10 in a wheelchair position shown in FIG. 1.

The present invention provides the advantage of permitting the invalid to transport herself in the apparatus 10 to and from raised surfaces of varying heights without the need of an attendant (either to push a wheelchair or to bear any weight of the invalid while moving the chair to or from a raised surface).

While the present invention as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims.

The invention claimed is:

1. A transportation apparatus for transporting an invalid onto a raised surface, the transportation apparatus comprising:

a) a seat portion, wherein the seat portion comprises a first and second spaced slide rails, the first and second slide rails being adapted to slide the seat portion a distance equivalent to at least 100% of the length of the seat portion;

b) a leg support pivotably connected to the seat portion;

c) at least one middle leg depending downwardly from the seat portion;

d) at least one rear leg depending downwardly from the seat portion;

e) at least one middle wheel connected to the middle leg, the middle wheel defining a middle rotation axis;

f) at least one rear wheel connected to the rear leg, the rear wheel defining a rear rotation axis; and g) at least one front wheel operatively connected to the leg support;

wherein the middle leg is adapted to vertically move the middle wheel, and the rear leg is adapted to vertically move the rear wheel; and wherein the seat portion is adapted for movement in a substantially horizontal direction in relation to the rear rotation axis or the middle rotation axis.

2. The apparatus of claim 1, further comprising a front leg connected to the leg support, wherein the front wheel is connected to a distal end of the front leg, wherein the front leg is adapted to adjust the position of the front wheel in relation to the leg support.

3. The apparatus of claim 1, wherein each of the first and second slide rails comprises a plurality of telescoping members adapted to slide the seat portion horizontally in relation to the middle rotation axis or the rear rotation axis.

4. The apparatus of claim 3, wherein the plurality of telescoping members comprises:

a) an outer rail defining a first longitudinal channel therein;

b) a middle rail received within the first longitudinal channel, the middle rail defining a second longitudinal channel therein; and c) an inner rail received within the second longitudinal channel.

5. The apparatus of claim 3, further comprising a connector, wherein a first end of the connector connected to an underside of the seat portion, and a second end of the connector is connected to a worm follower of a seat worm drive.

6. The apparatus of claim 5, wherein the seat worm drive is connected to the first slide rail by a bracket.

7. The apparatus of claim 1, further comprising a pair of spaced apart middle legs and a pair of middle wheels connected to each of the middle legs.

8. The apparatus of claim 7 further comprising a pair of spaced apart rear legs, and a pair of rear wheels connected to each of the rear legs.

9. The apparatus of claim 8, wherein each rear wheel comprises a swiveling wheel.

10. The apparatus of claim 8, further comprising a pair of spaced apart front legs connected to the leg support, and a pair of front wheels connected to each of the front legs.

11. The apparatus of claim 10, wherein the rear, middle, and front legs are moved by a corresponding leg worm drive.

12. The apparatus of claim 11, wherein each of the rear, middle, and front legs comprises:

a) a primary member, wherein a first end of the primary member is pivotably connected to a worm follower of the corresponding leg worm drive, wherein a second end of the primary member is connected to a corresponding wheel;

b) a secondary member, wherein a first end of the secondary member is pivotably connected to a worm housing of the corresponding worm drive, wherein a second end of the secondary member is pivotably connected to a point along the primary member.

13. The apparatus of claim 12, wherein each of the rear legs further comprises a support member having one end thereof pivotably connected to a second end of the secondary member and another end thereof connected to the rear wheel, wherein the support is adapted to maintain a predetermined orientation of the rear wheel in relation to the raised surface.

14. The apparatus of claim 11, wherein the leg worm drives for the rear and middle legs are connected to the slide rails.

15. The apparatus of claim 11, wherein the leg worm drives for the front legs are connected to an underside of the leg support.

16. The apparatus of claim 1, further comprising a leg support tilting arm, wherein a first end of the leg support tilting arm is pivotably connected to an underside of the leg support, and a second end of the leg support tilting arm is pivotably connected to a worm follower of a leg support worm drive.

17. The apparatus of claim 1, further comprising a backrest pivotably connected to the seat portion.

18. The apparatus of claim 17, further comprising a backrest tilting arm, wherein a first end of the backrest tilting arm is connected to a rear surface of the backrest, and a second end of the backrest tilting arm is pivotably connected to a worm follower of a backrest worm drive.

19. The apparatus of claim 18, wherein the backrest tilting arm comprises a first member pivotably connected to a second member.

20. The apparatus of claim 19, wherein the apparatus is self-propelled.

21. A transportation apparatus for transporting an invalid onto a raised surface, the transportation apparatus comprising:

a) a seat portion slidably connected to first and second spaced apart slide rails, each of the first and second spaced apart slide rails comprising a plurality of telescoping members;

b) a backrest pivotably connected to the seat portion;

c) a leg support pivotably connected to the seat portion;

d) at least one middle leg depending downwardly from the seat portion;

e) at least one rear leg depending downwardly from the seat portion;

f) at least one middle wheel connected to the middle leg, the middle wheel defining a middle rotation axis;

g) at least one rear wheel connected to the rear leg, the rear wheel defining a rear rotation axis; and h) at least one front wheel operatively connected to the leg support;

wherein the middle leg is adapted to vertically move the middle wheel, and the rear leg is adapted to vertically move the rear wheel; and wherein the plurality of telescoping members are adapted to slide the seat portion in a substantially horizontal direction in relation to the rear rotation axis or the middle rotation axis.

22. The apparatus of claim 21, wherein the apparatus is self-propelled.

* * * * *